(12) United States Patent
Vuori et al.

(10) Patent No.: US 7,774,464 B2
(45) Date of Patent: Aug. 10, 2010

(54) AUTOMATIC SYNCML CLIENT PROFILE CREATION FOR NEW SERVERS

(75) Inventors: Janne Vuori, Ruutana (FI); Valtteri Pihlajamaki, Tampere (FI); Arto Vahvanen, Nokia (FI)

(73) Assignee: Nokia Corporation, Espoo (FI)

( * ) Notice: Subject to any disclaimer, the term of this patent is extended or adjusted under 35 U.S.C. 154(b) by 651 days.

(21) Appl. No.: 11/617,285

(22) Filed: Dec. 28, 2006

(65) Prior Publication Data

US 2008/0162586 A1 Jul. 3, 2008

(51) Int. Cl.
*G06F 15/13* (2006.01)
(52) U.S. Cl. .................. 709/225; 709/250; 707/610; 707/617; 707/620
(58) Field of Classification Search ................. 709/225, 709/250; 707/610, 617, 620
See application file for complete search history.

(56) References Cited

U.S. PATENT DOCUMENTS

| 6,457,052 | B1 * | 9/2002 | Markowitz et al. ........... 709/225 |
| 6,978,453 | B2 * | 12/2005 | Rao et al. .................... 717/171 |
| 2002/0052847 | A1 * | 5/2002 | Shioda et al. ................. 705/51 |
| 2003/0191827 | A1 | 10/2003 | Piispanen et al. |
| 2003/0204640 | A1 | 10/2003 | Sahinoja et al. |
| 2003/0212826 | A1 | 11/2003 | Rapakko et al. |
| 2004/0006551 | A1 | 1/2004 | Sahinoja et al. |
| 2005/0138211 | A1 * | 6/2005 | Cheng ........................ 709/250 |
| 2005/0165947 | A1 | 7/2005 | Auriemman et al. |
| 2005/0203905 | A1 | 9/2005 | Jung et al. |
| 2006/0174103 | A1 | 8/2006 | Verma et al. |
| 2006/0199568 | A1 | 9/2006 | Seo et al. |
| 2006/0200596 | A1 | 9/2006 | So |

OTHER PUBLICATIONS

"DS Protocol," Open Mobile Alliance: Open Mobile Alliance: OMA_TS-DA_Protocol-V1_2-20060710-A, http://www.openmobilealliance.org/ipr.html, Jul. 10, 2006.
"An Introduction to OMA Device Management," IBM, http://www-128.ibm.com/developerworks/wireless/library/wi-oma/, Oct. 31, 2006.
"SyncML Representation Protocol, Data Synchronization Usage," Open Mobile Alliance: OMA-TS-DS_DataSyncRep-V1_2-20060710-A, http://www.openmobilealliance.org/ipr.html, Jul. 10, 2006.
"SyncML Server Alerted Notification," Open Mobile Alliance: OMA-TS-SuncML_SAN-V1_2-20050509-C, http://www.openmobilealliance.org/ipr.html, May 5, 2005.
"SyncML Meta Information," Open Mobile Alliance: OMA-TS-SyncML_MetaInfo-V1_2-20050509-C, http://www.openmobilealliance.org/ipr.html, May 9, 2005.

(Continued)

*Primary Examiner*—Jinsong Hu
(74) *Attorney, Agent, or Firm*—Banner & Witcoff, Ltd

(57) ABSTRACT

A system and method for having a client generate a new profile for a new server for the SyncML protocol is described. Conventionally, users of client devices need to manually configure the devices to allow for synchronization with new servers via SyncML. Using the described system or method, a client device may configure a profile for a new server without requiring the user to manually configure the synchronization profile.

35 Claims, 7 Drawing Sheets

OTHER PUBLICATIONS

"SyncML WSPBinding," Open Mobile Alliance: OMA-TS-SyncML_WSPBinding-V1_2-20050509-C, http://www.openmobilealliance.org/ipr.html, May 9, 2005.

"Enabler Release Definition for SyncML Common Specifications," Open Mobile Alliance: OMA-ERELD0SyncML_Common-V1_2-20050503-C, http://www.openmobilealliance.org/ipr.html, May 3, 2005.

"SyncML OPEX Binding," Open Mobile Alliance: OMA-TS-SyncML_OBEXBinding-V1_2-20050509-C, http://www.openmobilealliance.org/ipr.html, May 9, 2005.

"SyncML HTTP Binding," Open Mobile Alliance: OMA_TS-SuncML_HTTPBinding-V1_2-20050509-C, http://www.openmobilealliance.org/ipr.html, May 9, 2005.

"SyncML Representation Protocol," Open Mobile Alliance: OMA-SyncML-RepPro-V1_2-20050509-C, http://www.openmobiealliance.org/ipr.html, May 9, 2005.

"File Data Object Specification," Open Mobile Alliance: OMA-TS-DS_DataObjFile-V1_2-20060710-A, http://www.openmobilealliance.org/ipr.html, Jul. 10, 2006.

"OMA DS Device Information," Open Mobile Alliance: OMA-TS-DS_DevInf-V1_2-20060710A, http://www.openmobilealliance.org/ipr.html, Jul. 10, 2006.

"Enabler Release Definition for Data Synchronization," Open Mobile Alliance: OMA_ERELD-DS-11_2-20060710-A, http://www.openmobilealliance.org/ipr.html, Jul. 10, 2006.

"Email Data Object Specification," Open Mobile Alliance: OMA-TS-DS_DataObjEmail-V1_2-20060710-A, http://www.openmobilealliance.org/ipr.html, Jul. 10, 2006.

"Folder Data Object Specification," Open Mobile Alliance: OMA-TS-DS_DataObjFolder-V1_2-20060710-A, http://www.openmobilealliance.org/ipr.html, Jul. 10, 2006.

* cited by examiner

AUTOMATIC SYNCML CLIENT PROFILE CREATION FOR NEW SERVERS

FIELD OF THE INVENTION

Aspects of the invention relate generally to a method and device for handling synchronization related information between portable or mobile devices and databases.

BACKGROUND OF THE INVENTION

Users desire to keep data synchronized on their portable devices. Data of portable terminals, such as portable computers, PDA terminals (personal digital assistant), mobile stations or pagers, can be synchronized with network applications, applications of desktop computers, or with other databases of the telecommunications system. In particular, data of calendar and e-mail applications are typically synchronized between desktop computers or other databases and portable devices. Also, additional devices may include the ability to synchronize information. For instance, a digital camera may be able to synchronize pictures with a central picture managing server, providing an easy way to upload images from a digital camera.

To improve synchronization of application data, a language known as synchronized markup language SyncML, which is based on the XML (extensible markup language), has been developed. By using a SyncML synchronization protocol, which dictates the encoding and decoding of messages into and out of the SyncML format, data of various applications can be synchronized between network terminals. The SyncML synchronization protocol functions both in wireless and in fixed networks and supports several transmission protocols.

The synchronization markup language (SyncML) technology is an open specification for data synchronization. In general, synchronization takes place between a terminal device (e.g., a mobile phone) and a server device (e.g., an application in a local PC). To be able to understand each other, the SyncML client (the mobile phone) and SyncML server (the PC) encode data to be transmitted between them as a SyncML document. The coding or decoding/parsing of SyncML document can be performed by separate application components available to end-user applications (for instance, a user interface). The use of the SyncML protocol provides interoperability between different devices when trying to synchronize information between them.

Despite the ease of interoperability once a client and a server has been authenticated and initialized with respect to each other, the initial setup process between a client and a new server can be difficult. In particular, user interaction is required to manually set up a new profile for each new server. While similar servers may exist, each instance of the server generally requires a separate profile on the client with its own session history for each server. Unless the separate profile exists for a server, the client refuses the synchronization requests from the server. The profile creation process commonly involves opening a SyncML configuration utility, creating a new profile for a new server on the client, and defining one or more settings to permit communication with the new server. Only after manual creation of the profile does the client permit synchronization with the server. This manual interaction may prohibit the adoption of SyncML as a usable standard among various platforms.

SUMMARY OF THE INVENTION

Aspects of the invention relate to providing a system and method that promote easy activation of new servers for client devices (which may or may not include portable devices or mobile devices). In the first aspect, the client may automatically create a default profile for a newly uncovered server. In another aspect, the client creates a default profile for a newly uncovered server, but requesting user authentication of the server prior to automatic configuration. These and other aspects are described below.

DETAILED DESCRIPTION OF THE INVENTION

Figure 1:
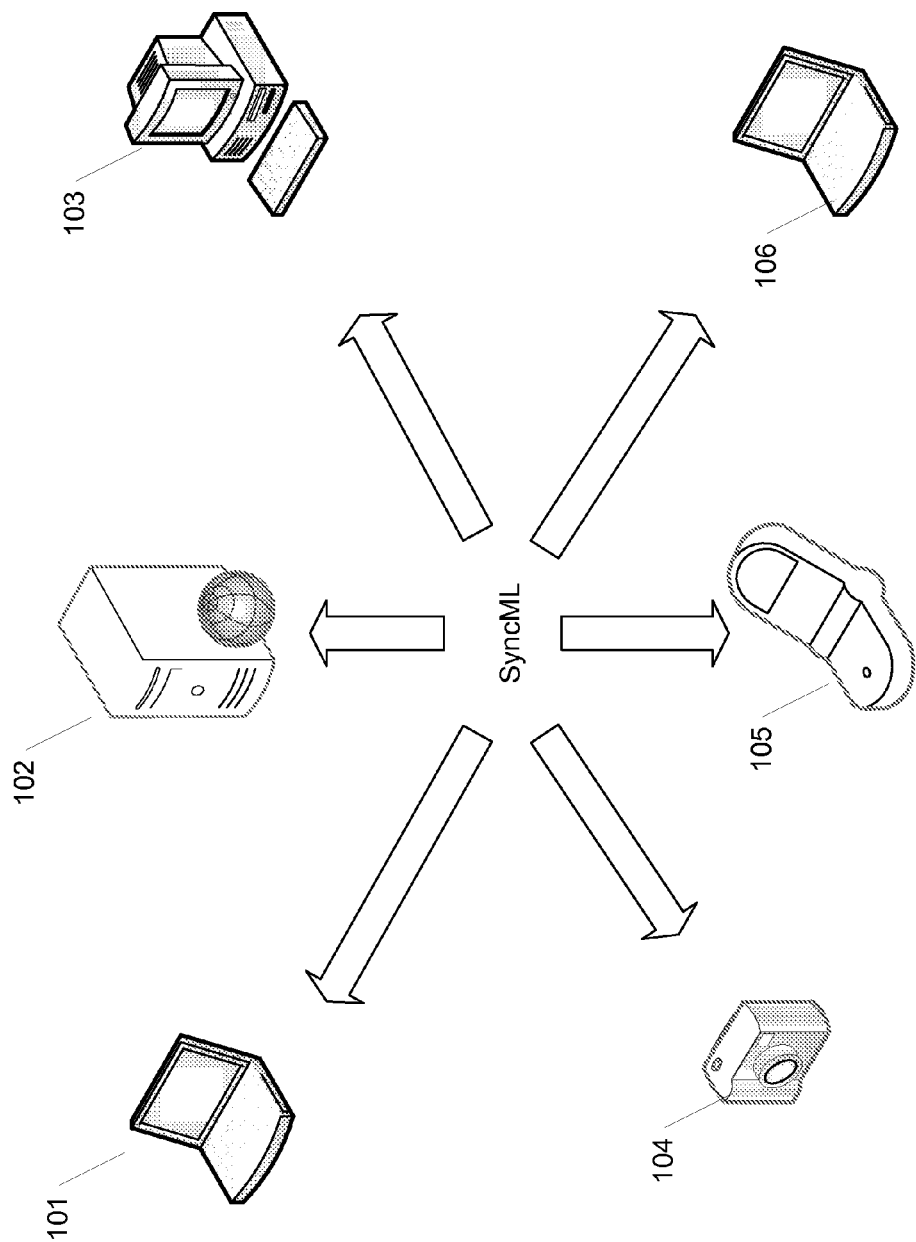
FIG. 1 shows various devices that may be interconnected using the SyncML protocol in accordance with aspects of the present invention.

Aspects of the present invention are described below that relate to automatic setup of a profile for a new server so as to be able to sync information with a client. For the purposes of explanation, equivalent parts as described herein are referenced by the same reference numerals.

It is noted that various connections are set forth between elements in the following description. It is noted that these connections in general and, unless specified otherwise, may be direct or indirect and that this specification is not intended to be limiting in this respect.

FIG. 1 shows the various devices between which synchronization based on the synchronization markup language (SyncML) may occur. A certain database content of preferably client terminals may be harmonized with database content provided by designated devices. Conventionally, mobile terminals act as synchronization clients harmonizing or synchronizing certain pre-defined data with the content of a database or several databases provided by dedicated server devices. FIG. 1 illustrates a plurality of possible client devices and server devices for the synchronization operation. Typically, client devices may be mobile stations like mobile phones 105 or personal digital assistants (PDA), mobile computers like notebooks 101, 106, digital cameras 104 or desktop computers 103. Further, dedicated synchronization server devices may include desktop computers like personal computer 103, a dedicated network server 102 or even a mobile computer as notebook 101, 106. It should be noted that the client device functionality is not limited to mobile terminals as described above although the presented concept of synchronization is described in view of mobile terminals connected to dedicated serving devices. For the purposes of description here, client devices may include mobile and/or portable devices (including but not limited to cell phones, PDAs, notebook computers, and the like) and non-mobile/non-portable devices (including but not limited to desktops, televisions, video projection systems, corded telephones, various household appliances, multi-function printers, and the like).

The participating synchronization devices, the client device and the server device, offer the possibility of using the SyncML synchronization service in order to harmonize data stored in both the client device and the server device. Therefore, the SyncML synchronization service allows the establishment of a synchronization session via a logical end-to-end connection between the participating devices. The SyncML synchronization service itself is based on the exchange of a synchronization document, which may be divided into a plurality of messages, comprising instructions in order to synchronize the data. The client device may include a dedicated synchronization client agent implementing the SyncML synchronization protocol for controlling the communication of the corresponding messages, whereas the server device includes a dedicated synchronization server agent implementing also the SyncML synchronization protocol. The synchronization protocol may control communication of the corresponding messages. The system may further include a synchronization server engine for analyzing which changes have to be made in accordance with the synchronization document. The synchronization may be understood as harmonizing data in accordance with the analysis results, e.g., modifying, replacing, deleting or similar operation of the data of the database but also the sending back of a synchronization message to the client device in order to process data stored therein. The term database is to be understood broadly as referring to a set of data of any data source or data storage that can be updated by one and more applications.

It should be further noted that the assigning of the term client device and server device, respectively, may based on the place of the analyzing operation. Commonly, the synchronization server operates the necessary analyzing of the synchronization. The analyzing operation is operated by the server device, since the server device offers usually higher processing capabilities in comparison to the client device. Naturally, a processing device may also act as a client device and as a server device.

The description above has introduced the synchronization service based on the SyncML synchronization standard. The following description will describe components of the client device and the server device, adapted for synchronizing content in accordance with the SyncML synchronization standard.

Figure 2:
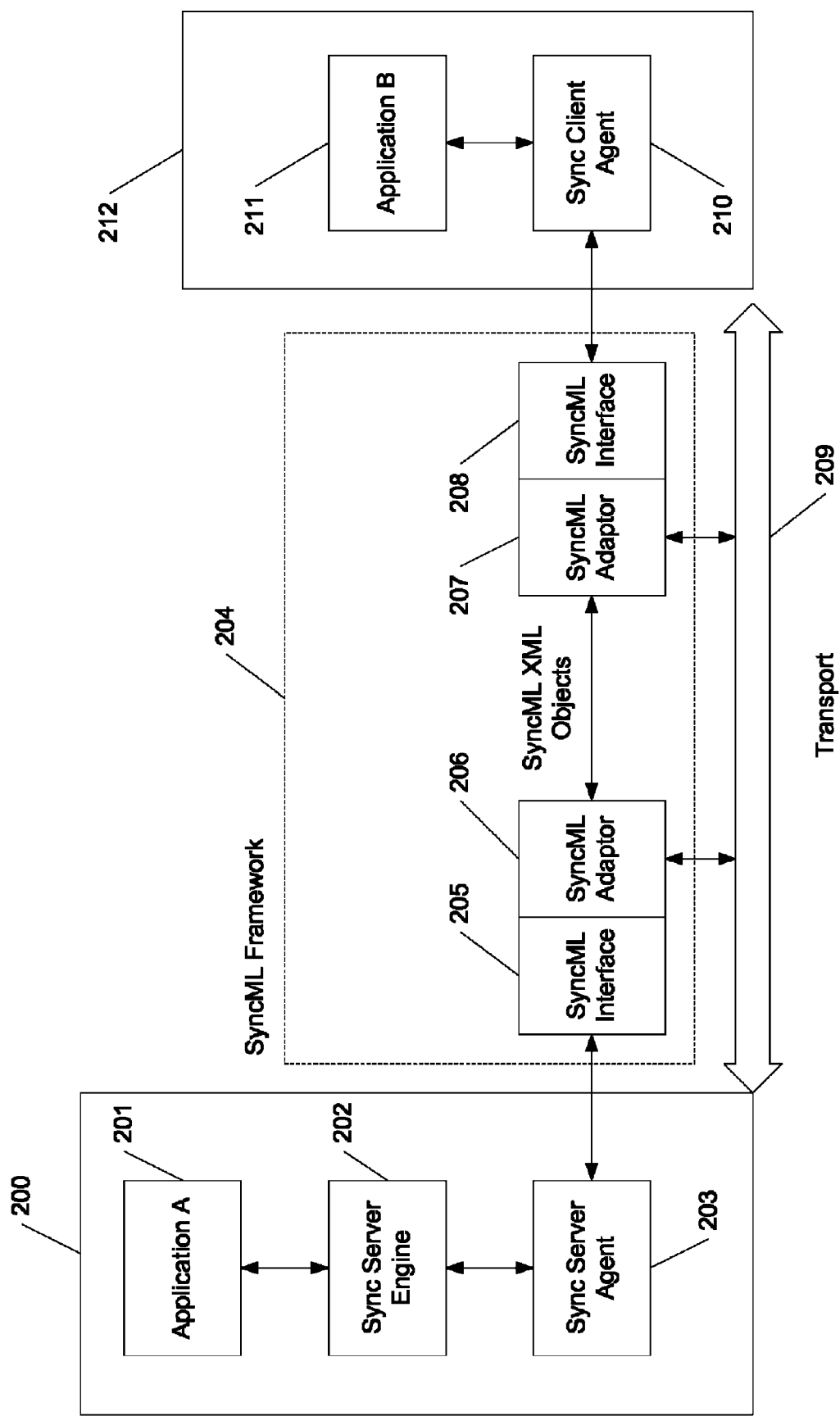
FIG. 2 shows the interaction between applications using a SyncML framework in accordance with aspects of the present invention.

FIG. 2 shows components of a client device and a server device which allow a synchronization operation between the client device and a server device based on the SyncML synchronization standard.

In FIG. 2, a server application A 201 represents a networked service that provides synchronization with another counterpart client application B 211. The synchronization data may be provided or processed by the server application 201 or client application 212, respectively. The server application 201 is hosted by the server 200, which may be a server device corresponding with the server device mentioned with reference to FIG. 1. Analogously, the client application 211 is hosted by the client 212, which may be a client device corresponding with the client device mentioned with reference to FIG. 1. The synchronization is performed between a server 200 and a client 212.

The server 200 and client 212 are connected over any network. The network provides a logical communication connection between the server 200 and client 212, allowing the establishment of the end-to-end communication during the synchronization which may be termed as a synchronization session. The server 200 and client 212 may include inputs for receiving communication from each other, directly or indirectly. Further, the client 212 and server 200 may include various processors and storage systems that support the SyncML data synchronization processes.

The client 212 may use the synchronization client agent 210 to access the network and send messages to the server via the synchronization adapter 207 and synchronization interface 208. SyncML XML objects may be exchanged between SyncML adaptors 206 and 207, using transport layer 209. The server 200 or server application 201, through the synchronization server agent 203, receives or sends messages, and manages the entire synchronization process through the synchronization server engine 202. Synchronization operations are conceptually bound into a synchronization package, which is a conceptual frame for one or more required synchronization messages. A synchronization message is a well-formed extended markup language (XML) document identified by the SyncML root or document element type. The document consists of a header (SyncHdr element type) and a body (SyncBody element type). The header specifies over all routing and versioning information, while the body is a container for one or more SyncML synchronization instructions. The instructions are containers for other element types that describe the specifics of the instruction, including any synchronization data or meta-information. Incorporated here, too, are features such as SyncML data formats (a common set of media types for commonly accepted information such as calendars and contacts) and SyncML capabilities exchange (in which a SyncML client and server determine what device, user, and application features each supports) are incorporated.

For example, a mobile phone acts as the SyncML client 212, and a server acts as the SyncML server 200. The client 212 sends a message to the server 200 regarding changes to data made on the client 212. The server 200 then synchronizes the data within the SyncML messages with data stored on the server 200, and returns modifications back to the client 212. The client 212 contains a synchronization client agent 210, and typically has the role of sending modifications first to the server 200. The client 212 is typically a mobile phone or PDA, and must also be capable of receiving messages back from the server 200. The server 200 contains the synchronization server agent 203 and the synchronization server engine 202, and usually waits for the client 212 to initiate synchronization, although the server 200 can initiate synchronization if unsolicited instructions are supported on the transport protocol level.

Figure 3:
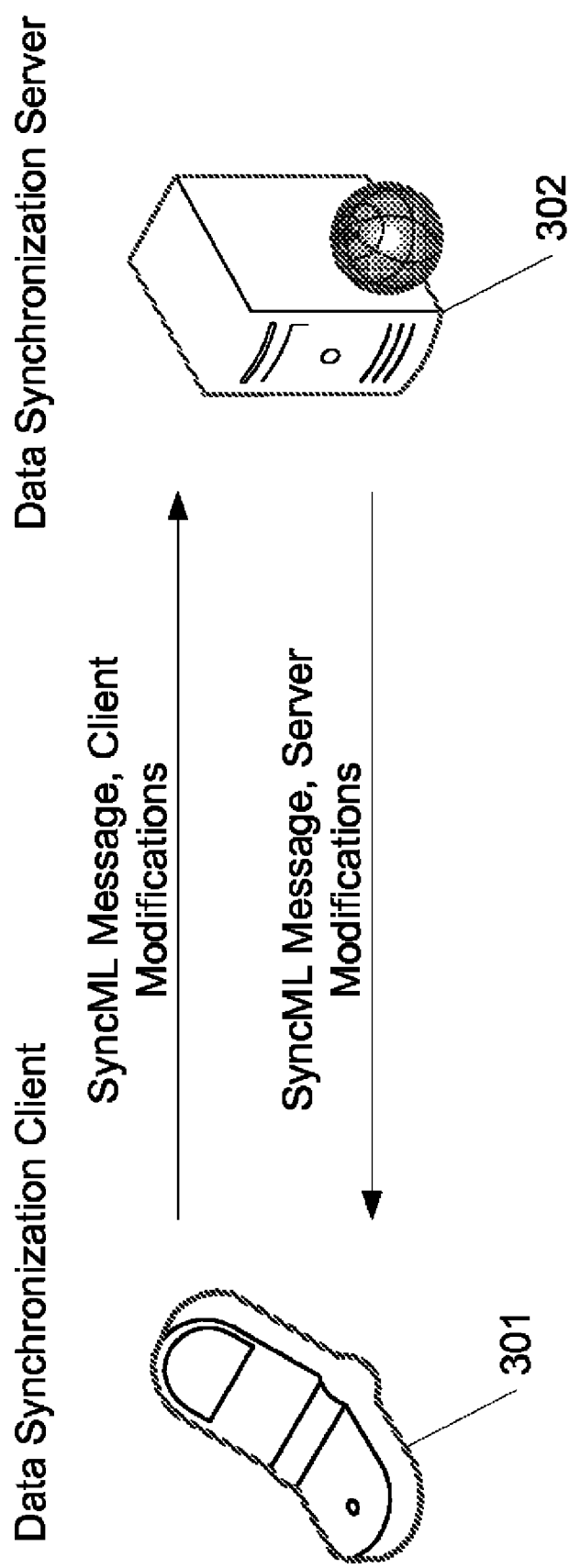
FIG. 3 shows synchronization between a client and server and accordance with aspects of the present invention.

FIG. 3 shows a data synchronization client 301 exchanging messages with a data synchronization server 302. For instance, the data synchronization client 301 may send SyncML messages and client modifications to data synchronization server 302. Also, the data synchronization server 302 may send SyncML messages and server modifications to data synchronization client 301.

Figure 4:
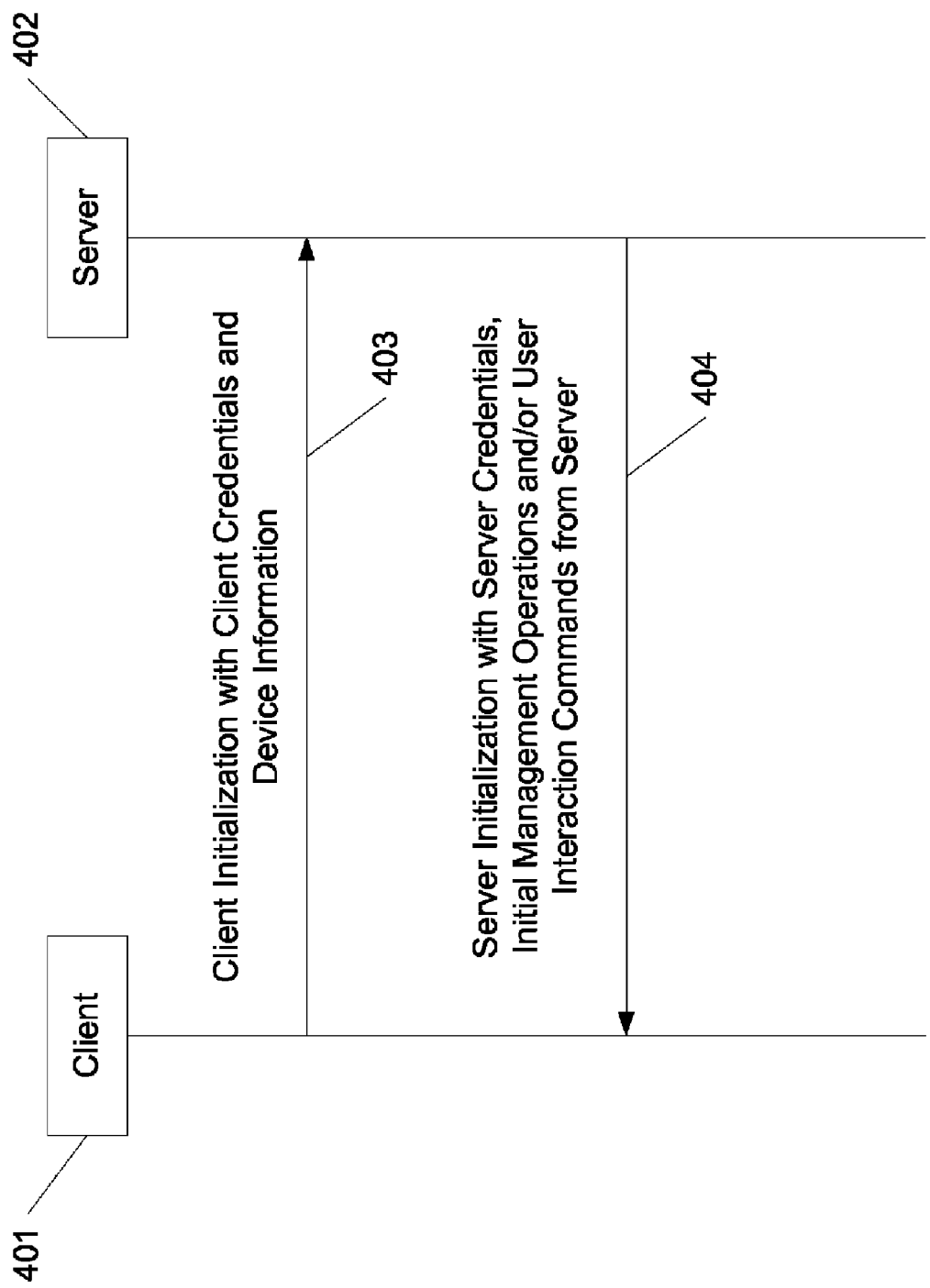
FIG. 4 shows initialization between a client and a server in accordance with aspects of the present invention.

FIG. 4 shows an initialization process between client 401 and server 402. Here, client 401 sends client initialization with client credentials and device information 403 to server 402. In response, server 402 sends server initialization information with server credentials including initial management operations and/or user interaction commands from the server 404 to the client 401. It is noted however that FIG. 4 shows the client and server initialization processes after server 402 has been activated for use with the client 401. The process for activating a server with a client is showing with respect to FIG. 5.

Figure 5:
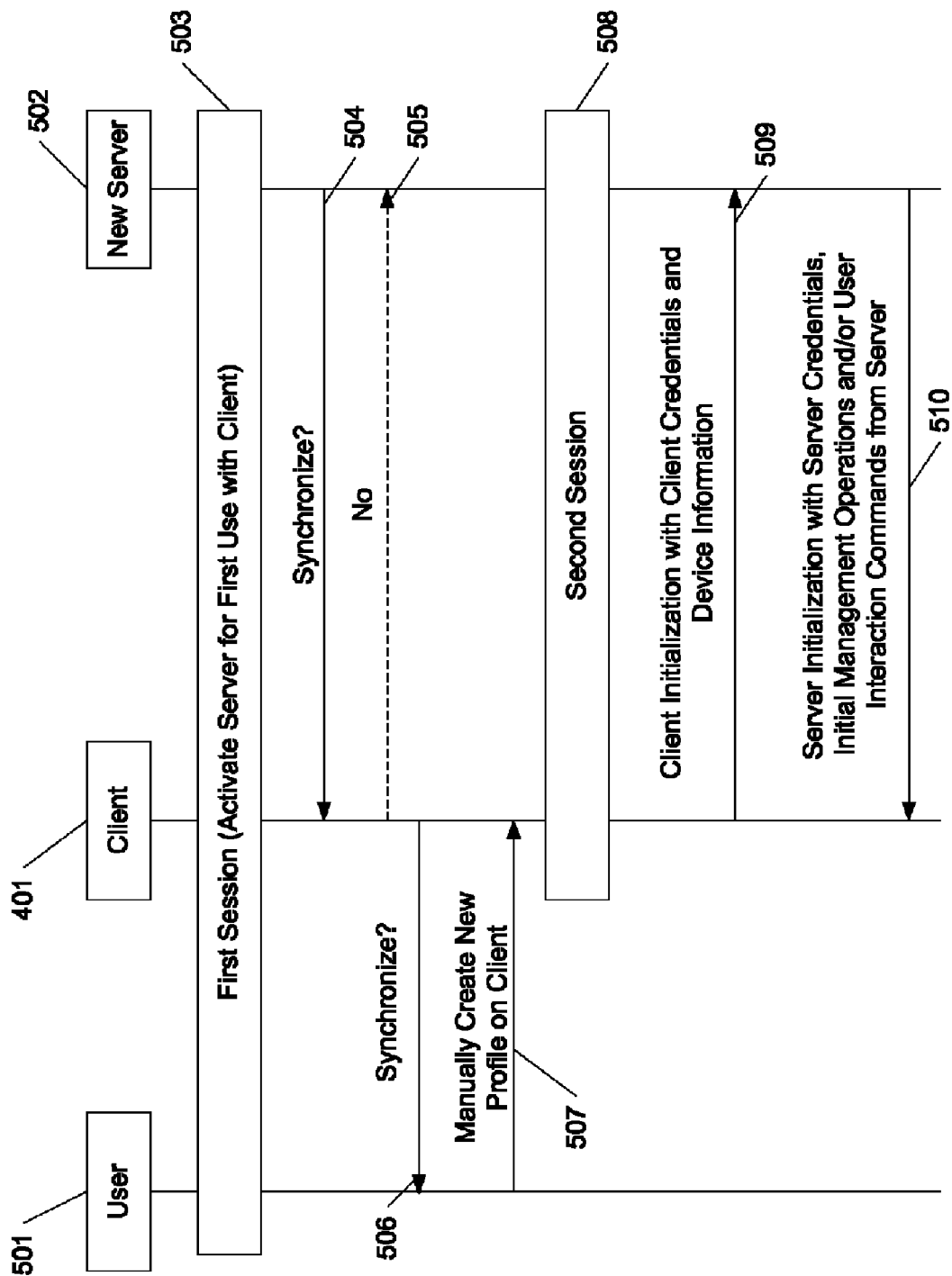
FIG. 5 shows an example of the conventional manual creation of a new profile on a client by a user.

FIG. 5 shows client 401, new server 502, and user 501. In a first session 503, a client is modified to activate a server for its first use with the client. First, new server 502 sends a synchronization request 504 to client 401. If client 401 does not desire to synchronize with new server 502, client 401 may send a denial 505 of the synchronization request 504. Alternatively, client 401 may send a request to user 501 regarding new server 502's synchronization request 504. If desired, the user 501 may create a new profile on client 401 as shown by arrow 507. It is noted here that the creation of the new profile is a manual process performed by user 501. For descriptive purposes herein the client may include one or more processors that control the creation of the profile as well as using a storage to store the profile.

One of the difficulties with requiring a user to establish a new profile for every new server is that users may become frustrated or tired of adding new servers to a client's list. Once users stop adding new server profiles, the benefits of synchronization are lost.

Figure 6:
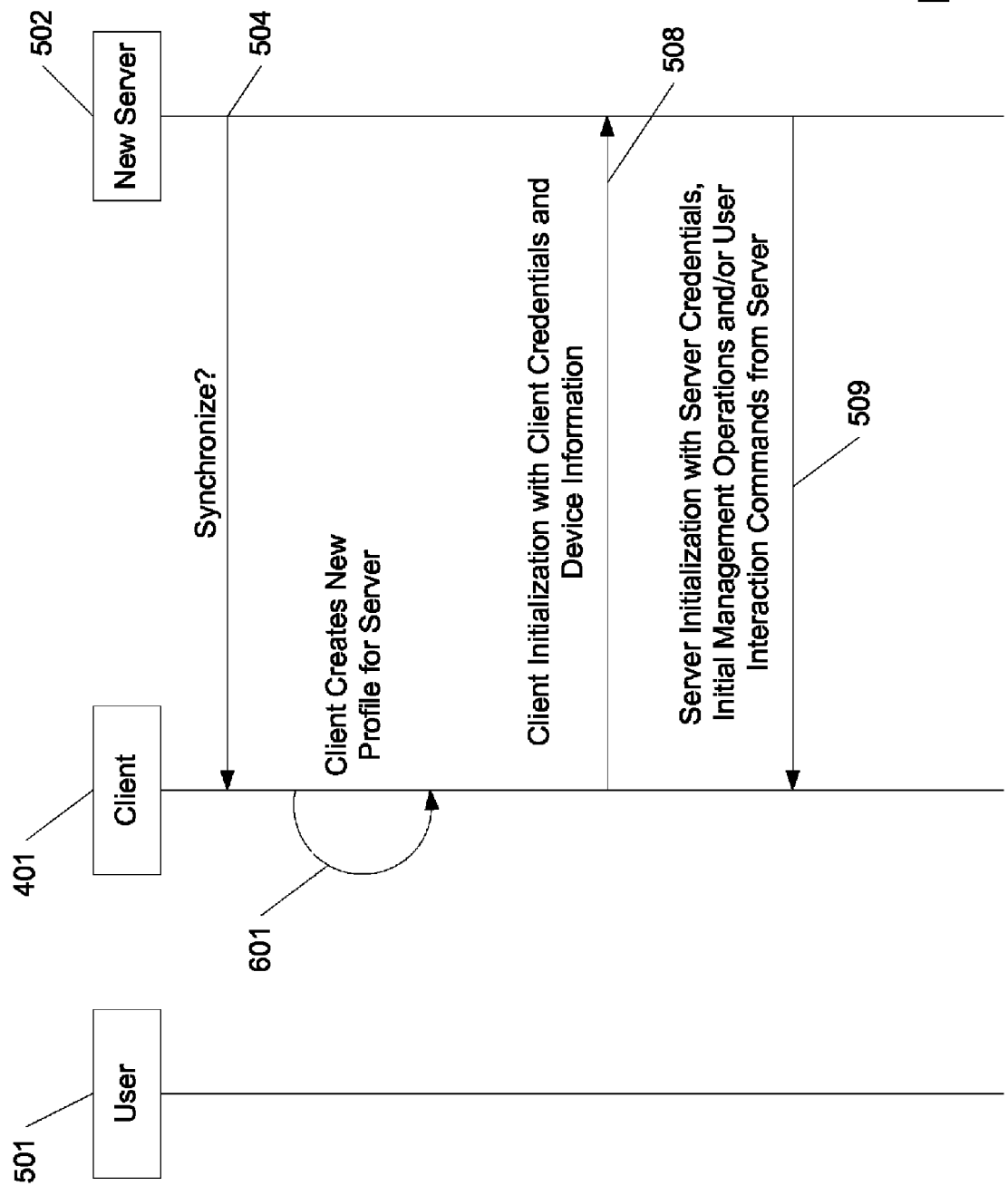
FIG. 6 shows the creation of a new profile by the client based on discovery of a new server in accordance with aspects of the present invention.

FIG. 6 shows client 401 automatically creating a new profile for the new server 502. Here, when client 401 detects a connection a letter from a previously unknown SyncML server 502, the client 401 may create a new profile for the server as shown by arrow 601. The profile may be generated using default client configuration information as well as information provided from new server 502.

One of the benefits of having the client perform the automatic profiling of new server 502 is that the synchronization process may begin within the same session.

Once the new profile for server 502 has been created in step 601, the client may send initialization information as shown by arrow 508 to new server 502. In response, the server 502 may send server initialization information 509 to client 401. The rest of the synchronization process may occur as shown in FIG. 1.

The local synchronization host address for the local server may be a local IP address (http://10.0.0.x for instance) or some other shared identification between the client and server. For example, the shared information may define which client profile and session history is used.

The software that operates the synchronization procedures on the client may be in the form of a program that is executed by the client. The program may be stored in a storage medium including but not limited to a RAM, ROM, Flash memory, hard drive, optical memory, magneto-optical memory, and the like. Further the program may be permanently or only temporarily stored in the memory.

Figure 7:
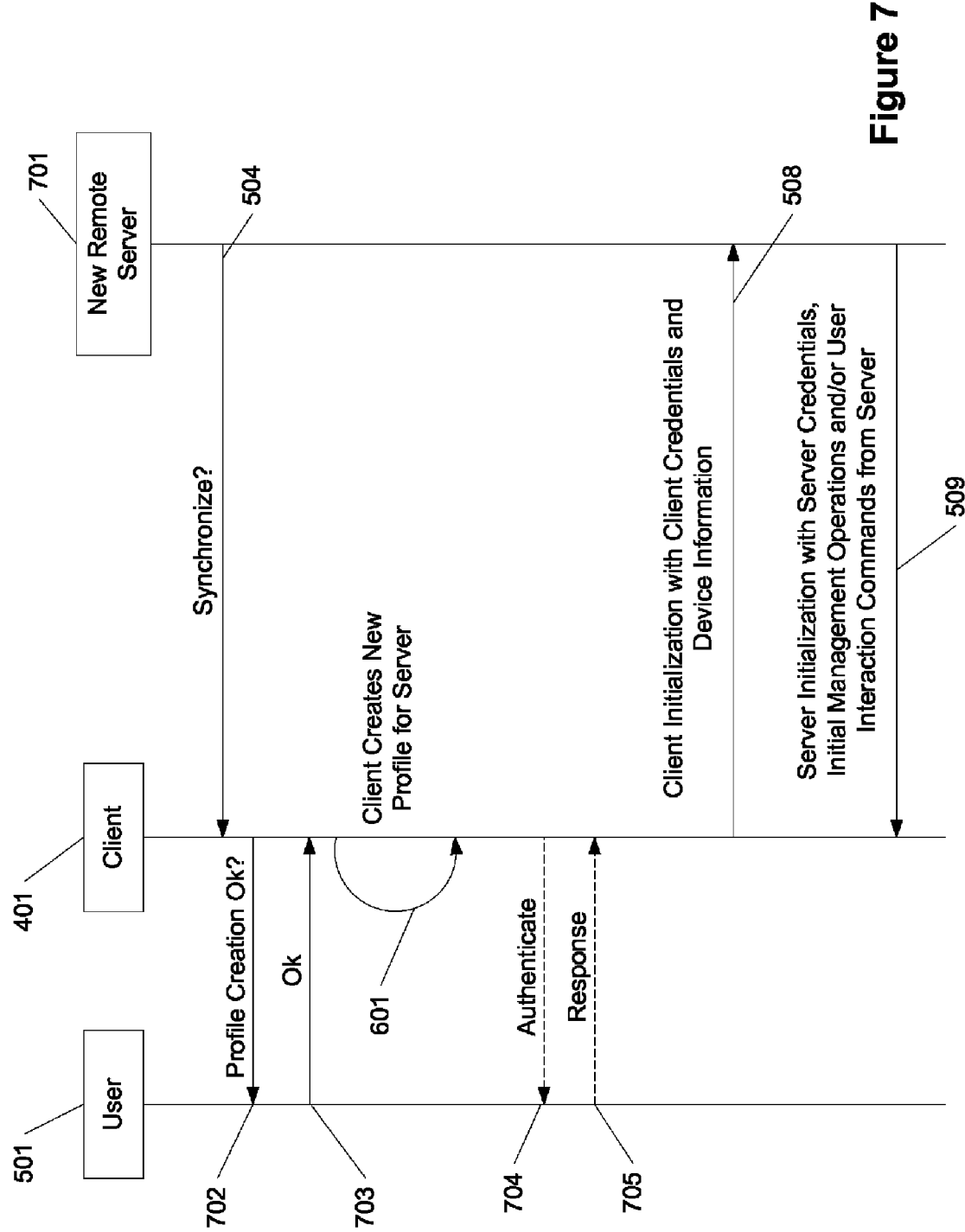
FIG. 7 shows the creation of a new profile by the client based on discovery of a new remote server in accordance with aspects of the present invention.

FIG. 7 shows a similar profile creation process to that of FIG. 6. Here however the server is a new remote server 701. One of the issues associated with new remote servers 701 is that there is a greater likelihood of fraud or malicious phishing for information possible from remote entities. In this regard, users may or may not be asked to authorize a profile creation for a new remote server 701 in client 401. For instance, client 401 may send request 702 to a user 501 (for instance, a visual alert on a user interface). The user 501 may then respond by authorizing 703 the new profile creation. The client 401 may then create (601) the new profile for the new remote server 701. The remaining client and server initializations 508, 509 may occur as above.

Further, the client 401 may wish to authenticate that the user 501 is indeed the correct user. To do this, client 401 may send an authentication request 704 to user 501, to which the user 501 responds with response 705.

As multiple different instances of a server can exist (for example separate car kits), the server sends unique identification information so that client is able to separate the different server instances from each other. The server can generate its unique identification information, for example, randomly or from license key, hardware configuration or separate protected identity module. The client can also identify the server indirectly, for example, from IP address or OBEX capability serial number from information received from the server. The client may accordingly create separate profiles for each unique instance of the server.

The following provides a first example of how a user may wish to have a profile automatically setup for a new server. Here, a car adaptor may act as a SyncML server and attempt to connect to a SyncML client (for instance, a phone) to exchange data. The car adaptor (or kit) may wish to retrieve a user's address book to permit a user to access the address book using the car's user interface rather than the phone's user interface. Here, the server (the car adaptor) is local. The client may then automatically configure a new profile for the car adaptor without user interaction. Next, synchronization may continue without user input.

The following provides a second example of how a user may wish to have a profile automatically set up for a new server. Here, a remote SyncML server is trying to connect over the air to a SyncML client (for instance, a phone) to exchange data. Instead of configuring the new profile manually, the SyncML client configures the profile automatically (with user confirmation) and synchronization can continue.

The SyncML client may create a new synchronization profile for every separate instance of an unknown data synchronization server using available information on the client and/or from the new server.

The profile information may include one or more of the following:

Profile name generated from server information;
Activated content types;
Default local database for each content type;
Remote databases as defined by server;
Host address from originator (where a SyncML server is accessible through this IP address or some other identifier);
Server ID;
Bearer (http for remote connection or OBEX for local connection) ID;
Default internet access point to be used for the connection establishment (also referred to as an access point identification);
Authentication username and password; and
Port number (if not available then client uses generic default value).

At least one benefit for creating new profiles by the client is that creating new profiles automatically allows ad hoc configuration and improves usability. For example, a synchronization service provider can activate and actually start a first synchronization during the same session. For example, separate sessions are not needed. Where a new server is requesting synchronization with a client, the client may start creating a new profile based on the synchronization request. The process for creating the new profile is described herein. The new profile may contain both information regarding the server (at least one of directly provided information (for example, server ID) or implicit information (IP address of server retrieved from packet header)) and default settings.

In effect, the client acts like the new server was previously known to the client. In some instances, the client may then request a slow synchronization with the server. Then synchronization may start between the client and server. Here, the server may or may not limit the content types from the client as based on a default configuration on either the server or client. If limited in the current session, the next synchronization session (either client or server initiated) may then permit synchronization of the previously non-synchronized content types. In the next synchronization session, the already existing profile can be used so the client-server binding and session history from the first synchronization remain valid.

Also, other mobile devices, various enhancements, car kits, and third party accessories using SyncML, can connect to the client without the manual configuration generally required by the standard SyncML protocol.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A method comprising:
   receiving at a synchronization markup language (SyncML) client computing device a synchronization request from a server;
   retrieving default client configuration information associated with the SyncML client computing device;
   retrieving server information from the server;
   automatically generating a server profile on said SyncML client computing device that allows said SyncML client computing device to use said server for a synchronization markup language (SyncML) data synchronization, said server profile based on the retrieved default client configuration information and retrieved server information; and
   performing synchronization markup language (SyncML) data synchronization based on said server profile.

2. The method according to claim 1, further comprising:
   after receiving said synchronization request at said SyncML client computing device, receiving an authorization from a user to generate said server profile.

3. The method according to claim 1, further comprising:
   authenticating a user to said SyncML client computing device.

4. The method according to claim 1, further comprising adding information to said generated server profile.

5. The method according to claim 4, wherein said generated server profile includes a profile name generated from the retrieved server information.

6. The method according to claim 4, wherein said generated server profile includes activated content types.

7. The method according to claim 5, wherein said generated server profile includes a default local database for each content type.

8. The method according to claim 4, wherein said generated server profile includes remote databases as defined by said server.

9. The method according to claim 4, wherein said generated server profile includes a host IP address, where the server is accessible through the host IP address or some other identifier.

10. The method according to claim 4, wherein said generated server profile includes a Server ID item.

11. The method according to claim 4, wherein said generated server profile includes a Bearer item.

12. The method according to claim 4, wherein said generated server profile includes an Access Point identification.

13. The method according to claim 4, wherein said generated server profile includes a port number for the server.

14. The method of claim 1, wherein automatically generating the server profile and performing the SyncML data synchronization are performed at the SyncML client in a single synchronization session.

15. The method of claim 1, wherein there is no user interaction at the SyncML client computing device between the time when the SyncML client computing device receives the synchronization request from the server and the time when the server profile is automatically generated on the SyncML client computing device.

16. An apparatus comprising:
   an input configured to receive synchronization requests from one or more synchronization markup language (SyncML) servers;
   a processor;
   a memory having stored therein machine executable instructions, that when executed, cause the apparatus to:
      receive a first synchronization request from a first synchronization markup language (SyncML) server;
      retrieve default client configuration information associated with a synchronization markup language (SyncML) client;
      retrieve server information from the first SyncML server; and
      automatically generate a server profile, said server profile corresponding to the first SyncML server, said server profile based on the retrieved default client configuration information and retrieved server information; and
   a storage configured to store the server profile corresponding to the first SyncML server.

17. The apparatus according to claim 16, wherein retrieving server information from the first SyncML server comprises extracting said server information from the synchronization request.

18. The apparatus according to claim 17, wherein said generated server profile includes a profile name generated from information from said server.

19. The apparatus according to claim 17, wherein said generated server profile includes activated content types.

20. The apparatus according to claim 19, wherein said generated server profile includes a default local database for each content type.

21. The apparatus according to claim 17, wherein said generated server profile includes remote databases as defined by said server.

22. The apparatus according to claim 17, wherein said generated server profile includes a host IP address, where the first SyncML server is accessible through the host IP address or some other identifier.

23. The apparatus according to claim 17, wherein said generated server profile includes a Server ID item.

24. The apparatus according to claim 17, wherein said generated server profile includes a Bearer item.

25. The apparatus according to claim 17, wherein said generated server profile includes an Access Point identification.

26. The apparatus according to claim 17, wherein said generated server profile includes a port number for the first SyncML server.

27. The apparatus of claim 16, wherein the apparatus is further configured to perform synchronization markup language (SyncML) data synchronization, and wherein automatically generating the server profile and performing the SyncML data synchronization are performed in a single synchronization session.

28. The apparatus of claim 16, wherein there is no user interaction at the SyncML client between the time when the SyncML client receives the synchronization request from the first SyncML server and the time when the server profile is automatically generated.

29. A computer storage medium having a program stored thereon, the program executable to perform steps comprising:
    receiving at a client a synchronization request from a server;
    retrieving default client configuration information associated with said client;
    retrieving server information from the server;
    automatically generating a server profile on said client that allows said client to use said server for a synchronization markup language (SyncML) data synchronization, said server profile based on the retrieved default client configuration information and retrieved server information; and
    performing synchronization markup language (SyncML) data synchronization based on said server profile.

30. The computer storage medium according to claim 29, the program executable to performs steps further comprising:
    after receiving said synchronization request at said client, receiving an authorization from a user to generate said server profile.

31. The computer storage medium according to claim 29, wherein the program, when executed, performs steps further comprising:
    authenticating a user to said client.

32. The computer storage medium according to claim 29, wherein automatically generating the server profile and performing the SyncML data synchronization are performed at the client in a single synchronization session.

33. The computer storage medium according to claim 29, wherein there is no user interaction at the client between the time when the client receives the synchronization request from the server and the time when the server profile is automatically generated on the client.

34. An apparatus, comprising:
    means for receiving a synchronization request from a synchronization markup language (SyncML) server;
    means for retrieving default client configuration information;
    means for retrieving server information from said SyncML server;
    means for automatically generating a server profile to allow the use of said SyncML server for a synchronization markup language (SyncML) data synchronization, said server profile based on the retrieved default client configuration information and retrieved server information; and
    means for performing synchronization markup language (SyncML) data synchronization based or said server profile.

35. The apparatus according to claim 34, further comprising:
    means for authenticating a user.

* * * * *